March 14, 1933.   S. W. FARBER   1,901,155
RECEPTACLE FOR LIQUIDS
Filed March 3, 1932
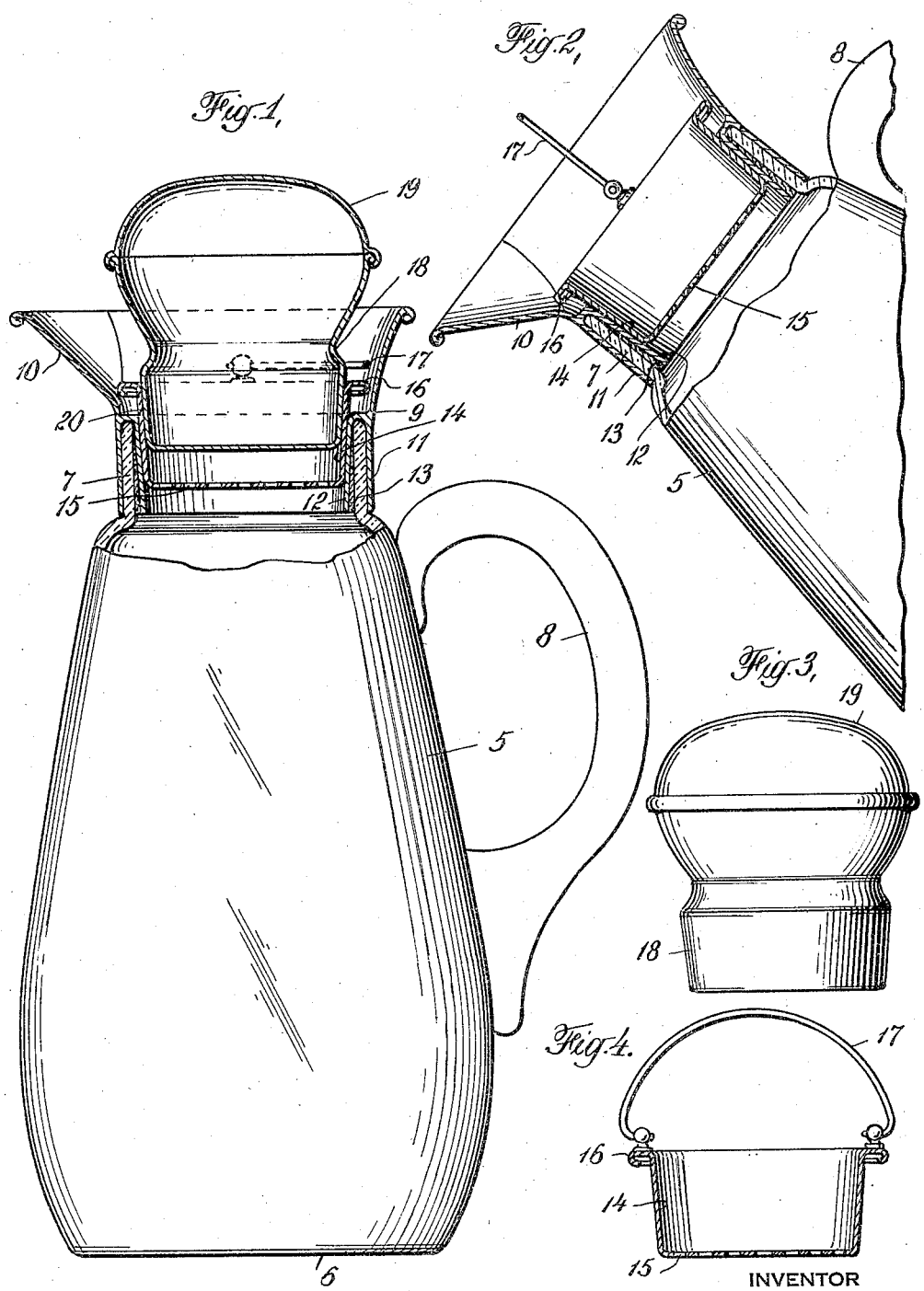
INVENTOR
SIMON W. FARBER
BY
Pennie, Davis, Marvin & Edmonds
ATTORNEYS Patented Mar. 14, 1933

1,901,155

UNITED STATES PATENT OFFICE

SIMON W. FARBER, OF BROOKLYN, NEW YORK, ASSIGNOR TO S. W. FARBER, INC., OF BROOKLYN, NEW YORK, A CORPORATION OF NEW YORK

RECEPTACLE FOR LIQUIDS

Application filed March 3, 1932. Serial No. 596,492.

This invention relates to receptacles for liquids and particularly to receptacles having means to facilitate shaking and dispensing of the contents and to prevent the inadvertent loss of any of the liquid.

It is the object of the invention to provide an attractive and relatively inexpensive receptacle having a liquid-tight closure which is easily removable and a strainer likewise removable but adapted to remain in position when the closure is removed for the purpose of retaining solids when the liquid contents are poured from the receptacle.

The invention will be better understood by reference to the following specification and accompanying drawing, in which Fig. 1 is an elevation partially in section of a receptacle embodying the invention in its preferred form;

Fig. 2 is an elevation of a portion of the receptacle also partly in section and showing the closure removed;

Fig. 3 is an elevation of the closure or stopper; and

Fig. 4 is a transverse section through the strainer.

Referring to the drawing, the invention is embodied in a receptacle 5 of glass, porcelain, stoneware, or other suitable material which may have any desired form, but which preferably tapers somewhat from its base 6 to a neck 7. Conveniently the receptacle may have a handle 8 formed integrally with or otherwise secured thereto.

A top 9 of metal or other suitable material providing a pouring lip 10 is secured to the neck 7 of the receptacle preferably by a suitable cement. The top 9 has an outer ferrule 11 which surrounds the neck 7 and may have conveniently an inner ferrule 12 spaced from the outer ferrule a distance slightly greater than the thickness of the neck 7. Cement 13 may be disposed between the neck 7 and the inner ferrule 12, for example, to hold the parts in assembled relation.

The internal surface of the top 9 adjacent the lower edge thereof is preferably slightly tapered and affords a smooth and tight joint with a cup-shaped removable strainer 14 perforated at its bottom 15 and having a flange 16 and a bail 17. The strainer fits tightly in the opening at the neck of the receptacle, there being an extended surface contact which ensures a good friction joint. The strainer will remain in place while the liquid contents are poured from the receptacle. Any solids such as ice, fruit seeds, or the like are retained by the strainer.

The inner surface of the cup-shaped strainer 14 is preferably slightly tapered and smooth and affords a sufficient surface to provide a good friction joint with a stopper 18 having a head 19 which may be grasped to facilitate removal of the stopper. The lower end 20 of the stopper may be slightly tapered to fit the contiguous surface of the strainer, and will prevent the escape of any liquid when the receptacle is shaken, for example, to mix or otherwise modify the contents.

As will be readily understood, the desired materials may be introduced to the receptacle, after which the strainer and stopper may be inserted. The contents may be shaken, if desired, or merely stored in the receptacle until they are needed. The tight joints between the strainer and the neck of the receptacle and between the strainer and stopper will prevent the escape of any liquid even if the receptacle is agitated violently. When the contents are to be dispensed the stopper may be withdrawn easily. The strainer will remain in place to prevent escape of solids. To permit introduction of additional materials or when the receptacle is to be cleaned, the strainer is easily withdrawn by grasping the bail.

The device as described is simple and effective, presents a good appearance, and is easily maintained in a clean and sanitary condition.

Various changes may be made in the form and construction of the receptacle and its parts without departing from the invention or sacrificing any of the advantages of the invention.

I claim:

1. A receptacle for liquids having a neck, a top member engaging the neck and forming an outlet, a removable cup-shaped strainer having an extended surface in frictional contact with the inner surface of the top member and a removable stopper having an extended surface in frictional contact with the inner surface of the cup-shaped strainer.

2. A receptacle for liquids having a neck, a top member having spaced ferrules embracing the neck and forming an outlet, a removable cup-shaped strainer having an extended surface in frictional contact with the inner surface of the top member and a removable stopper having an extended surface in frictional contact with the inner surface of the cup-shaped strainer.

In testimony whereof I affix my signature.

SIMON W. FARBER.